United States Patent Office 3,809,675
Patented May 7, 1974

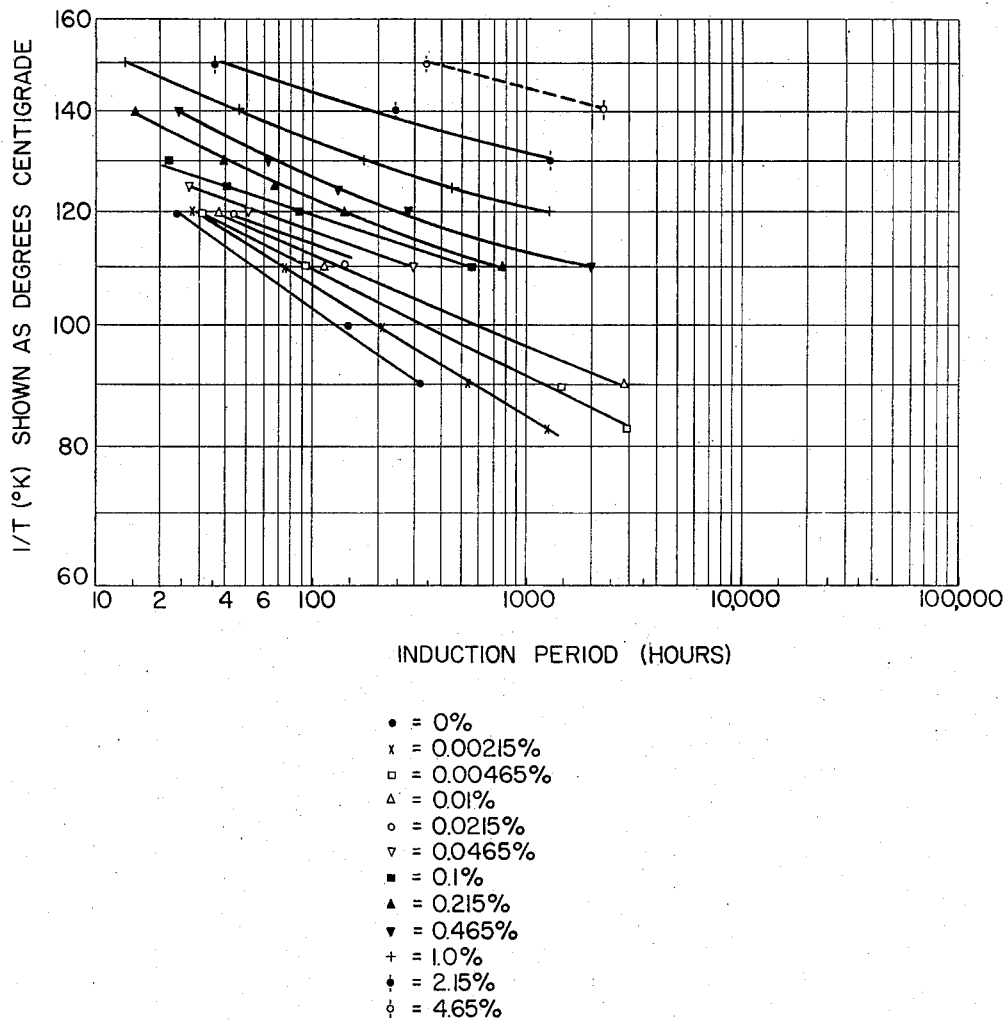
- • = 0%
- x = 0.00215%
- □ = 0.00465%
- △ = 0.01%
- ○ = 0.0215%
- ▽ = 0.0465%
- ■ = 0.1%
- ▲ = 0.215%
- ▼ = 0.465%
- + = 1.0%
- ♦ = 2.15%
- ⌀ = 4.65%

---

3,809,675
PHENYLHYDRAZONE ANTIOXIDANTS FOR POLYOLEFINS
Ralph Holm Hansen, Short Hills, N.J., assignor to Bell Telephone Laboratories, Incorporated, Murray Hill and Berkeley Heights, N.J.
Filed Nov. 8, 1972, Ser. No. 304,642
Int. Cl. C07c 109/12; C08g 51/60
U.S. Cl. 260—45.9 R
3 Claims

ABSTRACT OF THE DISCLOSURE

Oxidative degradation in polymeric hydrocarbon materials such as polyethylene and polypropylene is retarded by incorporation therein of phenylhydrazones.

---

This invention relates to stabilized polymeric compositions. More particularly, the present invention relates to essentially saturated hydrocarbon polymeric materials having included therein small amounts of additives which have been found to exhibit a retarding effect on deleterious oxidation of the material.

Considerable attention has been directed to the effects and prevention of thermal oxidation in the more common saturated polymers, particularly polyethylene, and polypropylene. Thermal oxidation as discussed herein is oxidation normally occurring in ordinary atmospheres, essentially independent of ultraviolet light, which varies or accelerates with increasing temperature. In recent years, a wide variety of antioxidant materials have been developed to provide a marked retardation of thermal oxidation. These antioxidants characteristically require a radical such as a secondary aromatic amino group or a hydroxyl group attached to an aromatic ring, such compounds resulting in a resonant stabilized structure. Typically, these compounds also contain additional substituents such as branched or normal aliphatic groups. More thorough treatment of antioxidant materials and the mechanisms involved therein may be found in "Advanced Organic Chemistry," 2nd ed., chapters 9 and 10, G. W. Wheland.

The particular polymeric materials suitable for use in accordance with the present invention are polymers containing tertiary hydrogen atoms. Such polymers are of two general types, those containing random numbers and spacings of tertiary hydrogen atoms such as polyethylene and those containing ordered hydrogen atoms such as polypropylene. The present invention relates to either type and mixtures thereof or copolymers containing one or more of either type. Specific compounds suitable for use in the present invention are polymers of olefins such as polyethylene, both conventional and high density, polypropylene, poly-4-methyl-pentene-1, poly-4-4-dimethyl pentene-1, polydodecene-1 and poly-3-methyl pentene-1.

Although the most common polymeric materials falling within the class delineated above are the polymerization products of monomers containing four or fewer carbon atoms, polymerized products of high-order monomers and copolymers and mixtures containing such polymers may also be stabilized in accordance with the present invention. For a discussion of the oxidative mechanism against which protection is imparted in accordance with the invention, see "Modern Plastics," vol. 31, pp. 121–124, September 1953.

Some of the polymeric materials included in the class set forth above have already attained considerable commercial importance, notably polypropylene and the various types of polyethylene. The other materials in this class have excellent electrical and mechanical properties and undoubtedly will find widespread use in the near future.

Many of the most important applications of polyethylene such as its use in cable sheathings depend on its good mechanical properties such as high tensile strength and abrasion resistance coupled with its resistant properties against water and water vapors. Other uses take advantage of its dielectric strength in applications such as primary insulation of metallic conductors. Such consequences of thermal oxidation in such polymers are an increase in the brittle point, impairment of tensile strength and deterioration of useful dielectric properties. Accordingly, a successful use of these materials in applications presently contemplated requires the use of an efficacious antioxidant material.

In accordance with the present invention, it has been found that substituted phenylhydrazones manifest a significant antioxidant effect when added or incorporated in the polymers of interest. The materials contemplated for use herein may be selected from the group consisting of (a)

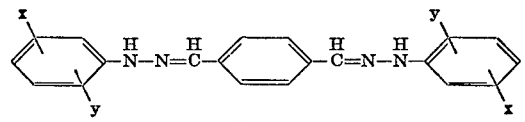

and (b)

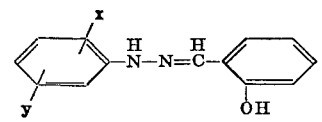

wherein $x$ and $y$ are selected from the group consisting of F, Cl, COOH, H and $NO_2$.

The advantages gained by the use of the compositions described herein will be more fully appreciated by reference to the following description taken in conjunction with the accompanying drawing wherein:

The figure is a graphical representation on coordinates of induction period of oxidative failure in hours against temperature in degrees centigrade showing the efficacy of the described stabilizers in polyethylene.

The antioxidants embodied herein are prepared by reacting phenylhydrazines of the general formula

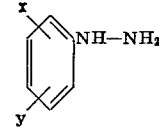

wherein $x$ and $y$ may be selected from among F, Cl, COOH, H and $NO_2$ with an aldehyde or dialdehyde selected from the group consisting of salicylaldehyde and terephthaldehyde. Reaction is effected by independently dissolving each of the reactants in an inert solvent, typically, a low molecular weight aliphatic alcohol such as methanol or ethanol heated to a temperature of the order of 50 degrees C., mixing the two solutions and refluxing the mixture for a time period ranging from 1 to 200 hours at reflux temperature. The reaction is facilitated with an acid catalyst, for example, acetic acid. When used, the acid is employed in minimal quantities, typically a drop or two. The reactions which occur are shown by the following equations.

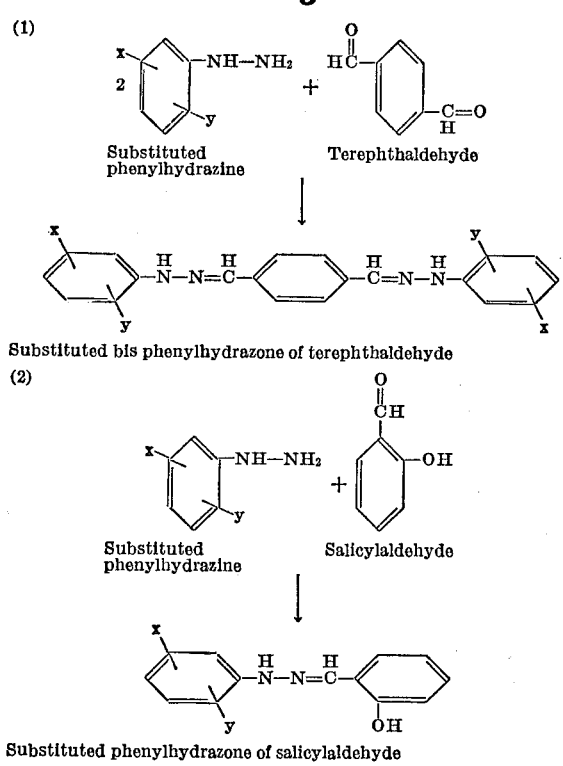

The antioxidants of the present invention are most useful in the range of from 0.002 to 10 percent by weight, based upon the weight of the polymer. Although the aforementioned range is not absolute, it will be understood that the minimum is dictated by considerations relating to the amount found necessary to effect significant antioxidant properties. The maxium is dictated by economic and practical considerations. It will be further understood that additional materials can also be used in the compositions described such as conventional pigments, reinforcing agents, fillers, accelerators and the like which are well known in the art.

In order to aid in the understanding of the invention, an outline of the procedure employed in determining antioxidant effect will now be given.

Initially, an antioxidant was prepared by independently dissolving two moles of phenylhydrazine and one mole of terephthaldehyde in 1,000 cc. of methyl alcohol heated to a temperature of approximately 50 degrees C. Then, the two solutions were mixed and 5 drops of glacial acetic acid was added thereto. The resultant mixture was then refluxed for three hours, so resulting in the preparation of bis-phenylhydrazone of terephthaldehyde. Longer reflux periods enhance the yield.

The hydrocarbon polymer together with the antioxidant was prepared by mill massing on a 6″ x 12″ two-roll mil having roll speeds of approximately 24 and 35 r.p.m. with the rolls at a temperature of about 120 degrees C. Various concentrations of antioxidant ranging from 0.00 (control) to 4.65 percent, by weight, based on the weight of the polymer was incorporated into the polymer being tested. The polyethylene used in the studies was a high molecular weight, high pressure polymer obtained from commercial sources. Test samples, approximately 10 mils in thickness were obtained by molding the mill-massed compositions at 125° C. Duplicate samples of the 10-mil molded material, each weighing 0.100 gram, were placed in calibrated oxygen uptake burets and sealed in an atmospere of pure oxygen. The specimens were then placed in constant temperature baths and the time required for the interaction of the polymer composition with 1 cc. (or 10 cc./gram) was chosen as the point at which oxidation had proceeded sufficiently to destroy useful physical and dielectric properties of the polymeric composition. Duplicate samples were prepared for each composition at a variety of temperatures both above and below the melting point of the polymer itself.

With reference to the figure, there is shown a graphical representation on coordinates of induction time in hours against temperature in degrees centigrade showing the time period required to effect thermal oxidation of the polyethylene described above for various concentrations of antioxidant incorporated therein. It will be noted that at 0.00215 percent by weight antioxidant, 550 hours at 90 degrees C. is required to effect oxidation in contrast with the control in which the same effect was reached after only 300 hours. At 0.01 percent by weight antioxidant, this effect was reached at 90 degrees C. after 1300 hours. It will therefore be apparent to those skilled in the art that the novel antioxidants described herein are as effective as many of the presently available commercial antioxidants.

The procedure described above was repeated with the exception that the antioxidant was prepared by reacting two moles of substituted phenylhydrazine wherein the $x$ and $y$ substituents were Cl, F, COOH, $NO_2$. The results obtained in oxidative degradation studies were similar to those set forth above.

The procedure described above was repeated with the exception that the antioxidant was prepared by reacting one mole of phenylhydrazine in methyl alcohol with one mole of salicylaldehyde in methyl alcohol to yield the phenylhydrazone of salicylaldehyde. The results obtained on oxidative degradation studies were similar to those set forth above.

What is claimed is:

1. Composition stabilized against oxidative degradation comprising a normally solid polymer of an alpha olefin having incorporated therein a compound of the general formula

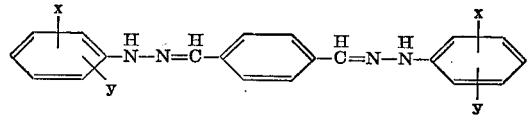

wherein $x$ and $y$ are selected from the group consisting of F, Cl, COOH, H and $NO_2$, said compound being present in an amount ranging from 0.002 to 10 percent by weight based upon the weight of the polymer.

2. Composition in accordance with claim 1 wherein said compound is

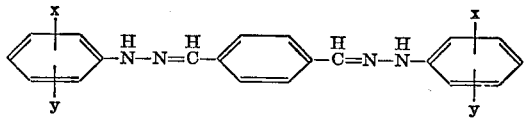

3. Composition in accordance with claim 2 wherein $x$ and $y$ are hydrogen.

References Cited

UNITED STATES PATENTS

| | | | |
|---|---|---|---|
| 3,142,658 | 7/1964 | Stewart | 260—45.9 R |
| 3,407,173 | 10/1968 | Kuriyama et al. | 260—45.9 R |
| 3,269,962 | 8/1966 | Eichhorn | 260—45.9 R |

FOREIGN PATENTS

| | | | |
|---|---|---|---|
| 896,308 | 5/1962 | Great Britain | 260—45.9 R |

DONALD E. CZAJA, Primary Examiner

G. R. MARSHALL, Assistant Examiner

U.S. Cl. X.R.

260—45.85, 566 B